Jan. 3, 1933.  K. E. PEILER  1,893,062

METHOD OF AND APPARATUS FOR CIRCULATING MOLTEN GLASS

Filed July 2, 1930  2 Sheets-Sheet 1

Witness:
G. A. Duberg

Inventor:
Karl E. Peiler
by Brown & Parlow
Attorneys.

Jan. 3, 1933.   K. E. PEILER   1,893,062
METHOD OF AND APPARATUS FOR CIRCULATING MOLTEN GLASS
Filed July 2, 1930   2 Sheets-Sheet 2
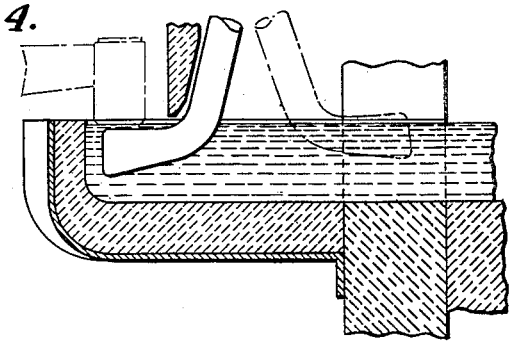
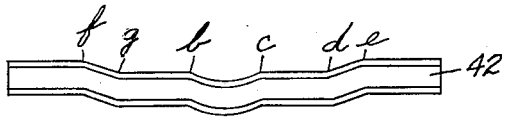
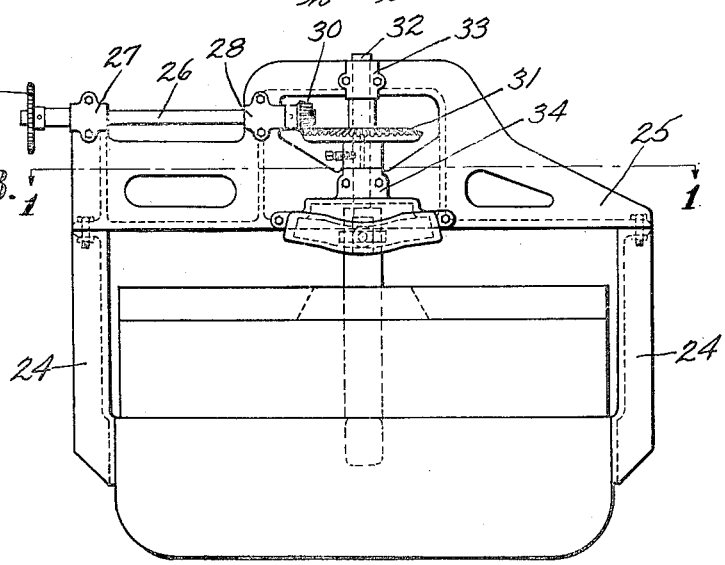
Witness:
G. A. Huber
Inventor:
Karl E. Peiler
by Brown & Darlow
Attorneys.

Patented Jan. 3, 1933

1,893,062

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

METHOD OF AND APPARATUS FOR CIRCULATING MOLTEN GLASS

Application filed July 2, 1930. Serial No. 465,254.

This invention relates to methods of and apparatus for circulating molten glass and relates particularly to the circulation of molten glass in a gathering pool from the surface of which charges of glass are removed by a suction gathering receptacle.

One of the most difficult and serious problems in the art of fabricating glassware is that of maintaining a supply of glass of proper homogeneity, especially in a gathering pool from which charges are removed by suction.

Not only does the condition of the glass in a gathering pool change through natural causes, such as local chilling, but the successive contact of gathering receptacles with the surface of the glass produces chilled spots therein, which are augmented by the "tails" or "bits" of glass produced by the severing operation. These "bits" or "tails" of glass drop back into the gathering pool and unless proper care is taken to remove them from the gathering zone, they will be entrained into the gathered charges of glass, causing imperfections in the finished ware.

The present invention is concerned primarily with the circulation of glass in such a gathering pool, and has for one of its objects the provision of a novel method of, and novel apparatus for, circulating the glass, by the employment of which the above and other difficulties are largely overcome.

A more specific object of the invention is to provide a novel method of conditioning molten glass in a gathering pool from the surface of which charges of glass are removed by suction, and novel apparatus for practicing the method, in the employment of which a stirring implement, or impeller, is dipped into the glass and moved therein along a path preferably coincident with the path which the gathering receptacle or mold follows while a charge of glass is gathered thereby. Such manipulation of the implement or impeller insures a supply of fresh homogeneous glass in the gathering zone, and may be effected periodically in synchronism with the movement of one or more molds, in which case, the movement of the implement that on one mold and succeed that of another; or the manipulation of the implement or impeller may be effected without regard to the movement of the mold, or molds, in which case the implement or impeller may be held submerged during its passage through the gathering zone, to a sufficient extent to permit it to clear the bottom of the mold, or molds. However, if desired, the latter operation also may be effected in synchronism with the movement of the molds or gathering receptacles.

A further object of the invention is to provide a novel method and novel apparatus, of the above character, wherein the glass not only is circulated in the gathering zone, as by moving an implement or impeller while dipping in the glass, in a path coincident with the path of a mold or gathering receptacle, but a skimming of the glass inwardly of the gathering zone also is effected. This not only results in maintaining the glass in the gathering zone in the proper condition, but in a displacement of chilled portions and "bits" of glass near the surface of the gathering pool, inwardly of the pool and where they may be remelted and reassimilated by the main body of glass.

The combined circulation and skimming may be effected by rotating a stirring implement or impeller having a glass contacting portion of proper shape, about a vertical axis, while oscillating the implement about a horizontal axis, to dip the glass contacting portion thereof to the proper depth in the glass while passing through the gathering zone, and to elevate it during the movement thereof inwardly of the gathering zone. The latter operation not only results in the partial withdrawal of the glass contacting part of the implement from the glass to effect a skimming action, but also to entirely remove at least a portion of the implement from the glass, thereby permitting the glass previously set in motion thereby, to pass beneath the implement or impeller and inwardly of the pool, for reconditioning.

Other objects of the invention will be of which follows, or will become apparent from such description.

In order that the invention may be more readily understood, and its several advantages appreciated, reference should be had to the accompanying drawings, depicting novel apparatus for practicing the novel method. In said drawings:

Fig. 3 is a view in front elevation of the construction shown in Figs. 1 and 2;

Fig. 4 is a view in vertical section of a fragmentary portion of the construction shown in Figs. 1, 2 and 3, illustrating a modified arrangement of, and a modified method of employing, the construction shown in Figs. 1, 2 and 3;

Figure 1:
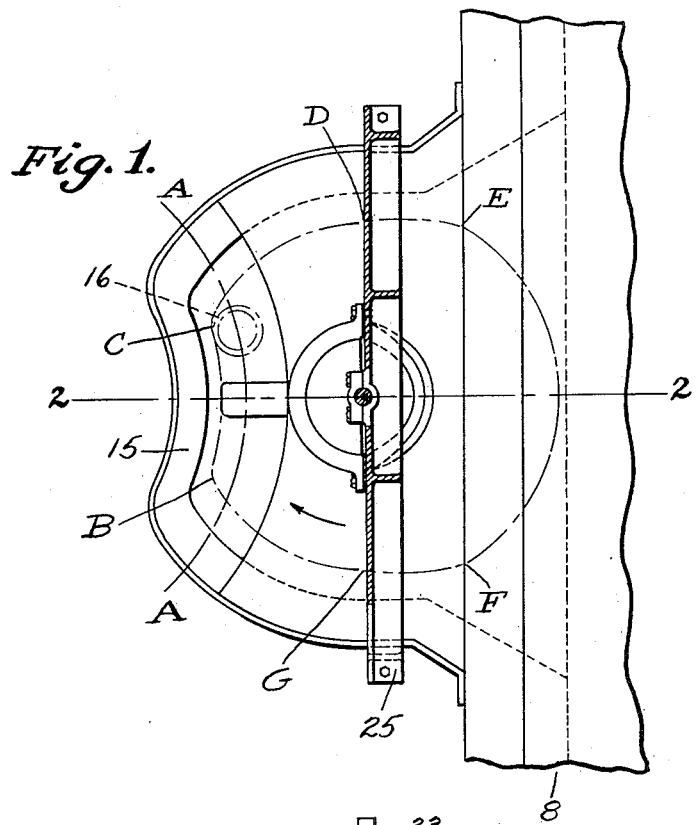
Figure 1 is a view principally in top plan, but partly in horizontal section of apparatus embodying the invention, and taken on the line 1—1 of Fig. 3.
Figure 2:
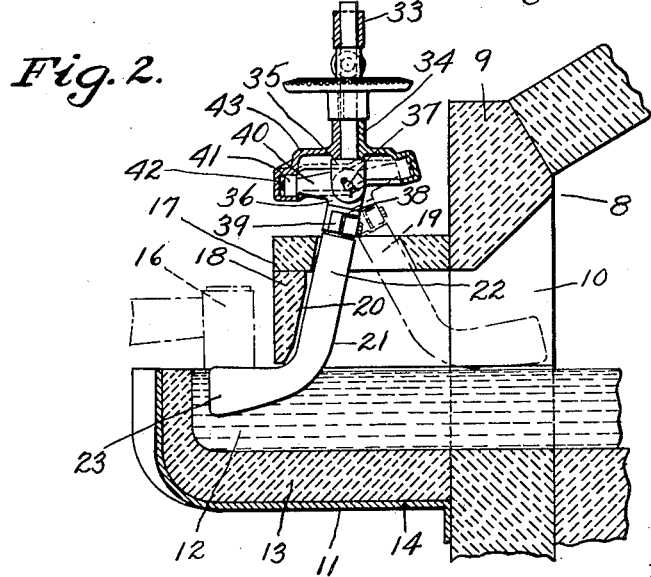
Fig. 2 is a view in vertical section taken substantially on the line 2—2 of Fig. 1.

Fig. 5 is a developed view of one form of a cam which may be embodied in the construction shown in Figs. 1, 2, and 3, and designed automatically to effect a certain manipulation of the impeller or stirring implement; and Fig. 6 is a developed view of a modified form of cam which may be employed in the construction shown in Figs. 1, 2, and 3 in lieu of the cam shown in Fig. 5, for effecting a different manipulation of the implement or impeller.

The apparatus illustrated in the drawings comprises the refining end of a glass melting tank, indicated generally at 8, the front wall 9 of which has an opening 10 therein which leads into an extension 11 for containing a pool 12 of molten glass. The extension 11 may comprise refractory material 13 surrounded by sheet metal as indicated at 14. The front side of said extension, designated 15, may be of arcuate shape as shown, (Fig. 1) to correspond with the circular path of travel of rotating molds or receptacles, one of which is indicated at 16, and which operate to gather charges of glass from the surface of the gathering pool by suction, in known manner.

The gathering pool 12 may be partially enclosed by means of a horizontal refractory cover 17 from the front edge of which an arcuate-shaped wall 18 depends. The wall 18 is set inwardly of the front edge of the extension 11 to leave a segmental portion of the gathering pool exposed to permit the molds or receptacles to be dipped into the gathering zone, thereby provided. The cover 17 and the wall 18 provide a heating space above the gathering pool to which heat is conducted through the opening 10 in the front wall of the furnace, from above the glass in the glass tank proper, as will be obvious from Fig. 2. The cover 17 is provided with an opening 19 and the front wall 18 is cut away downwardly and outwardly as indicated at 20 to provide for the arrangement of a stirring implement or impeller 21 within the enclosure formed by the cover 17 and the wall 18, and to permit the implement to be manipulated to condition the glass in the gathering pool.

The stirring implement or impeller 21 may be of "boomerang" shape as shown in Figs. 2 and 4, it consisting of a stem portion 22 and a head 23 extending at an obtuse angle to the stem portion in a generally horizontal direction.

Although the implement 21 may be supported and manipulated by hand, automatic mechanism preferably is provided for that purpose. Said mechanism may be supported by a framework secured to the extension 11 as shown in Figs. 1 and 3, which framework comprises vertical members 24 arising from the opposite sides of the extension 11 to the upper ends of which the horizontal frame member 25 is secured.

The mechanism for operating the implement includes a horizontal drive shaft 26 suitably journaled in bearings at 27 and 28 provided in the frame member 25. The drive shaft 26 has a sprocket wheel 29 secured to the outer end thereof which may be engaged by a chain (not shown) driven by suitable means (also not shown). Mounted on the inner end of the shaft 26 is a beveled pinion 30 in mesh with a bevel gear 31 secured to a vertical countershaft 32 mounted in bearings 33 and 34 carried by the frame member 25.

The implement 21 is connected to the vertical countershaft 32 by means of a clevis 35 and a bell crank lever 36 pivotally retained in the clevis by the pin 37. The downwardly depending arm 38 of the bell crank lever 36 carries a clamp 39 which receives and grips the upper end of the stem 22 of the stirring implement. The outwardly extending substantially horizontal arm 40 of the bell crank lever 36 has a cam roller 41 mounted on the outer end thereof which rides in a cam groove 42 provided in a casting 43 surrounding the bottom end of countershaft 32 and the clevis 35, and formed preferably integrally with the bearing 34 for said countershaft.

By means of the above described mechanism, rotation of the shaft 26 will cause the countershaft 32 and the stirring implement or impeller 21 connected thereto to be rotated in a generally circular path, and as a result of such rotation, oscillation of the implement 21 will be effected by the engagement of cam roller 41 with the cam 42. Such oscillation will be effected at times, and to an extent, depending upon the contour of the cam 42, such contour being selected according to the manner in which it is desired to manipulate the implement 21.

In the preferred operation of the above described apparatus, the cam 42 (Fig. 5) is employed and as a result the stirring implement or impeller is moved in such a way that the outer end of the head 23 describes a path as indicated approximately by the broken line in Fig. 1. The said implement may be rotated in either a clockwise or counterclockwise direction but preferably is rotated in a direction contrary to that of the molds or gathering receptacles 16.

Assuming that the implement is rotated clockwise, as indicated by the arrow, Fig. 1, and that the point of beginning is at B, the direction of movement of the implement may change at the successive points C, D, E, F, G and B. Between such points the implement may follow courses as indicated by the lines BC, CD, DE, EF, FG, and GB.

The movement of the impeller along but inwardly of the re-entrant line BC, in the construction shown, results in the head 23 moving as a whole in a path coincident with the path A—A of the mold, which insures that fresh glass will be presented to each mold. Such movement is effected by the cooperation of cam roller 41, with a concave portion $bc$ of the cam 42 (Fig. 5) and is accompanied by a dipping movement of the impeller resulting from the oscillation of the implement about horizontal pivot 37.

The movement of the impeller along, but inwardly of, line CD is effected by the part $cd$ of the cam 42, with which cam roller 41 cooperates to hold the head of the implement at an intermediate level.

As the implement reaches and passes the point D, (Fig. 1) the cam roller 41 rides up the inclined part $de$ (Fig. 5) of the cam, to raise a substantial portion of the head of the implement out of the glass as it travels along but inwardly of line DE, where it is so held while traveling along line EF, by the uppermost horizontal portion $ef$ of the cam. It is preferred not to completely withdraw the head of the implement from the glass because such an operation would produce or tend to produce blisters therein.

Upon reaching and passing point F, the head of the implement is lowered by roller 41 riding down the inclined part $fg$ of the cam, which movement occurs during the travel from point F to point G, and causes the head of the implement to be partially immersed to an intermediate level where it is held during the rotation from G to B, this completing the cycle of rotation.

It will be understood that the above described operation of the stirring implement may be synchronized in such a way that the implement is moved through the gathering zone (i. e. from B to C) immediately after a gathering receptacle or mold has gathered a charge, so that chilled glass produced both by the gathering and severing operations will be replaced by fresh homogeneous glass from the melting tank for the oncoming receptacle or mold. The rotation of the implement away from the gathering zone will serve to impel such chilled glass inwardly of the gathering pool toward the melting tank and the elevation of the implement, as previously described, not only will serve to skim the surface of the glass, but will permit the impelled chilled glass to flow beneath the implement into the glass melting tank. When the implement reaches its innermost position as shown in dotted lines in Fig. 2, any glass that may be adhering thereto will be removed by the action of heat above the glass inwardly of the furnace.

In view of the fact that the implement is held above the glass for a relatively long part of its travel inwardly of the gathering pool, and is not again dipped into the glass until it is rotated again out of the opening connecting the gathering pool with the melting tank, there will be no danger of the implement returning chilled glass to the gathering zone. On the contrary, the implement will serve to impel fresh homogeneous glass into said zone.

The above described method and the apparatus for performing the method, may be simplified if desired by maintaining the head of the stirring implement immersed in the glass throughout its complete cycle of operation. Fig. 4 illustrates the performance of such a method, said figure showing the head of the implement immersed in the glass, both in the gathering zone and inwardly thereof. The implement may be so operated by hand, but preferably is operated by the apparatus shown in Figs. 1, 2 and 3, and by employing a cam 42$a$ shown in the developed view in Fig. 6 in lieu of cam 42.

As shown in Fig. 6 the cam 42$a$ is almost entirely horizontal except for the concave portion $hi$, which portion is or may be identical with the portion $bc$ of cam 42 as shown in Fig. 5. Such concave portion $hi$ of the cam 42$a$ causes the head of the implement to be dipped during the travel thereof through the gathering zone and to move in a path substantially coincident with the path of the mold or molds as is the case with the operation of the implement by the use of cam 42 of Fig. 5. The horizontal part of the cam is arranged to maintain the head of the implement immersed at least to the level shown in broken lines in Fig. 4, which with the addition of the dipping movement caused by the concave cam portion $hi$, insures free passage of the mold or molds through the glass without striking the implement. Thus the rotation of the implement is not necessarily synchronized with the rotation of the molds, even though the implement is moved substantially along the mold path.

It is to be understood that the invention is not limited to the exact details of the method and apparatus illustrated and described herein, but various changes may be made in the steps of the method and in the construction of the apparatus without departing from the appended claims.

Having thus described my invention what I desire to claim and to secure by Letters Patent is:

1. The method of circulating molten glass in a gathering pool, from the surface of which charges of glass are removed by a suction gathering receptacle rotating in a circular path through a gathering zone, which comprises, supporting a stirring implement from over the pool, rotating said implement in a closed path about a vertical axis to move it toward and inwardly of the gathering zone while maintaining said implement in the heated environment of said pool, and manipulating said implement to cause the glass contacting portion thereof to move through the glass in the gathering zone in a path concentric with the path of the gathering receptacle.

2. A method according to claim 1 wherein the implement is manipulated to cause the glass contacting portion thereof to move through the gathering zone in a path substantially coincident with the path of the gathering receptacle.

3. The method of circulating molten glass by an implement which comprises, rotating said implement in a closed path about a substantially vertical axis, and simultanenously oscillating said implement about a substantially horizontal axis, while constantly maintaining the implement in the heated environment of said pool.

4. The method of circulating molten glass in a gathering pool from the surface of which charges of glass are removed by a suction gathering receptacle, which comprises rotating an implement dipping in the glass about a substantially vertical axis while moving the glass contacting portion of the implement toward and away from the zone from which the charges of glass are gathered, imparting vertically downward and upward movements to the glass contacting portion of said implement while moving it through said gathering zone, and constantly maintaining the implement in the heated environment of the gathering pool.

5. The method of circulating molten glass in a pool thereof which comprises, supporting a stirring implement from over the pool while rotating it about a substantially vertical axis, to move the glass contacting portion thereof in a closed path co-extensive with the pool, and manipulating said implement in each cycle of rotation to hold a glass contacting part thereof immersed in the glass during a part of the cycle, and out of contact with the glass in another part of the cycle.

6. The method of circulating molten glass in a pool thereof which comprises, holding a stirring implement from over the pool while rotating it about a substantially vertical axis, to move the glass contacting portion of said implement in a closed path co-extensive with the pool, and manipulating the implement in each cycle of rotation to hold a glass contacting portion immersed in the glass during a part of the cycle to circulate the glass beneath the surface thereof, in a position to skim the glass in another part of the cycle, and to hold the implement out of contact with the glass in another part of the cycle.

7. The method of circulating molten glass from the surface of which charges are removed by a suction gathering receptacle which is rotated in a fixed path through a gathering zone, which comprises, supporting a stirring implement from over the glass while rotating it about a substantially vertical axis, to move the glass contacting portion thereof in a closed path co-extensive with the pool, and manipulating the implement in each cycle of rotation to cause a glass contacting portion thereof to move through the glass in the gathering zone, along a path substantially coincident with the path of the gathering receptacle, during a part of the cycle, and to skim the glass inwardly of the gathering pool in another part of the cycle.

8. A method according to claim 7 wherein a substantial portion of the implement is held out of contact with the glass inwardly of the gathering zone in another part of the cycle.

9. The method of circulating molten glass in a gathering pool, which comprises supporting a stirring implement from above the pool, rotating said implement in a closed path co-extensive with said pool, and manipulating said implement in each cycle of rotation thereof to cause the glass contacting portion of the implement to move through the glass along a path re-entrant with respect to the remainder of the said closed path.

10. In combination with a container having a pool of molten glass therein, an implement for circulating the glass in said pool, means for supporting said implement from over said pool, means for rotating said implement in a closed path co-extensive with said pool, and means for moving said implement to cause the glass contacting portion thereof to move through the glass in the pool in a path re-entrant with respect to the remaining portion of the path of travel thereof.

11. In combination with a container for molten glass from the surface of which glass charges are removed by suction in a gathering zone, an implement for circulating the glass, means for supporting said implement from over the glass, means for actuating said implement to circulate the glass, and means for holding the glass-contacting portion of the implement immersed in the glass while it is moved through the gathering zone, and for holding said implement in a position to skim the glass, said supporting and actuating means being arranged to maintain the implement in the heated environment of the pool at all times.

12. In combination with a container for a pool of molten glass, from the surface of which charges of glass are removed by suction in a gathering zone, an implement for circulating the glass in said pool, means for supporting said implement from over the pool, means for actuating said implement to circulate the glass, and means operating to hold the glass contacting portion of said implement immersed in the glass while it is moved through the gathering zone, and to withdraw a substantial portion of the implement from contact with the glass exteriorly of the gathering zone, said supporting and actuating means being arranged to maintain the implement in the heated environment of the gathering pool at all times.

13. In combination with a container for a pool of molten glass, from the surface of which charges of glass are removed by suction in a gathering zone, an implement for circulating the glass in said pool, means for supporting said implement in the heated environment of the pool at all times and means for operating said implement to immerse the glass contacting portion thereof while it is moved through the gathering zone, to hold the glass contacting portion of the implement in a position to skim the glass in said pool, and to withdraw a substantial portion of the implement from contact with the glass.

14. In combination with a container for a pool of molten glass, from the surface of which charges of glass are removed by molds which travel in a fixed path through a gathering zone, an implement for circulating the glass in said pool, means for supporting said implement from over the pool, means for rotating said implement in a closed path coextensive with said pool, and means for causing the glass-contacting portion of said implement to move through the gathering zone while immersed in the glass, along a path substantially coincident with the path of movement of said molds.

15. In combination with a container for a pool of molten glass, an implement for circulating the glass in said pool, said implement comprising an inclined stem having a substantially horizontal glass-contacting portion, means permanently located over the pool for supporting said implement, means for rotating said implement about a substantially vertical axis extending through the pool, and means for oscillating said implement about a substantially horizontal axis, to cause the glass contacting portion of the implement to move in a closed path overlying said pool, and to be raised and lowered during the movement thereof in said closed path.

16. In combination with a container for a pool of molten glass, an implement for circulating the glass comprising an upwardly inclined stem having a substantially horizontal glass contacting head thereon, means permanently located over the pool for supporting said implement for rotation and oscillation, means for rotating said implement about a vertical axis, cam means, and means constantly effective to control the vertical position of the head of said implement relative to the glass according to the shape of said cam means, said cam means being shaped to periodically oscillate said implement.

17. In combination with a container for a pool of molten glass, an implement for circulating said glass, means permanently located over said pool for supporting said implement for movement in contact with the glass, means for rotating said implement about a vertical axis, a closed circular cam, and means connected to said implement and constantly engaging said cam, said cam having surfaces of such contour as to hold the glass contacting portion of the implement in a predetermined horizontal plane, and periodically to lower and raise said portion of the implement relative to said plane.

18. In combination with a container for a pool of molten glass, an implement for circulating the glass, means permanently located over the pool for supporting the implement for contact therewith, means for rotating the implement about a substantially vertical axis, a circular cam, and means interconnecting said cam and said implement, said cam having surfaces shaped respectively to hold the glass contacting portion of the implement in a predetermined plane, to lower and raise said portion beneath and into said plane, and to raise and lower said portion above and into said plane.

Signed at Hartford, Connecticut, this 30th day of June, 1930.

KARL E. PEILER.